(12) United States Patent
Seino et al.

(10) Patent No.: US 12,503,457 B2
(45) Date of Patent: Dec. 23, 2025

(54) FLUORINE-CONTAINING PYRIMIDINE COMPOUND, AND METHOD FOR PRODUCING SAME

(71) Applicant: UNIMATEC CO., LTD., Tokyo (JP)

(72) Inventors: Junya Seino, Kitaibaraki (JP); Rie Aotsu, Kitaibaraki (JP); Keisuke Kokin, Kitaibaraki (JP)

(73) Assignee: UNIMATEC CO., LTD. (JP)

( * ) Notice: Subject to any disclaimer, the term of this patent is extended or adjusted under 35 U.S.C. 154(b) by 672 days.

(21) Appl. No.: 17/910,860

(22) PCT Filed: Mar. 24, 2021

(86) PCT No.: PCT/JP2021/012124
§ 371 (c)(1),
(2) Date: Sep. 12, 2022

(87) PCT Pub. No.: WO2021/193685
PCT Pub. Date: Sep. 30, 2021

(65) Prior Publication Data
US 2023/0117960 A1    Apr. 20, 2023

(30) Foreign Application Priority Data

Mar. 25, 2020   (JP) .............................. JP2020-055036

(51) Int. Cl.
*C07D 403/04*        (2006.01)
(52) U.S. Cl.
CPC ................................. *C07D 403/04* (2013.01)
(58) Field of Classification Search
CPC .................................................... C07D 403/04
See application file for complete search history.

(56) References Cited

U.S. PATENT DOCUMENTS

| | | |
|---|---|---|
| 2004/0192914 A1 | 9/2004 | Kallander et al. |
| 2005/0143578 A1 | 6/2005 | Kallander et al. |
| 2007/0173504 A1 | 7/2007 | Pacofsky et al. |
| 2013/0216498 A1 | 8/2013 | Eastwood et al. |
| 2015/0018353 A1 | 1/2015 | Kim et al. |
| 2015/0342954 A1 | 12/2015 | Kim et al. |
| 2016/0324856 A1 | 11/2016 | Long et al. |
| 2019/0135793 A1 | 5/2019 | Petrocchi et al. |

FOREIGN PATENT DOCUMENTS

| | | |
|---|---|---|
| CN | 102695706 A | 9/2012 |
| EP | 0515041 A2 | 11/1992 |
| EP | 3094327 A1 | 11/2016 |
| JP | S59-104364 A | 6/1984 |
| JP | H11-049755 A | 2/1999 |
| JP | 2013-515688 A | 5/2013 |
| WO | 2003-031434 A1 | 4/2003 |

(Continued)

OTHER PUBLICATIONS

International Search Report for corresponding International Application No. PCT/JP2021/012124 dated Jun. 8, 2021, with English translation (5 Pages).
Zhang, Nan, Bioorganic & MedicinalChemistry, 2009, vol. 17, pp. 111-118 compound 29 (8 pages).
Zhang, Pei-Zhi, Tetrahedron, 2016, vol. 72, pp. 3250-3255 (3 pages).
Yang, Bin, ACS Catalysis, 2018, vol. 8, pp. 2839-2843 (2 pages).
Ouyang, Yao, Angewandte ChemieInternational Edition, 2018, vol. 57, 6926-6929 (2 pages).
Written Opinion for corresponding International Application No. PCT/JP2021/012124 dated Jun. 8, 2021, with English translation (8 Pages).
International Preliminary Report on Patentability for corresponding International Application No. PCT/JP2021/012124 dated Jun. 8, 2021, with English translation (9 Pages).

(Continued)

*Primary Examiner* — Brenda L Coleman
(74) *Attorney, Agent, or Firm* — Harness, Dickey & Pierce, P.L.C.

(57) ABSTRACT

A fluorine-containing pyrimidine compound represented by the following formula (1) is provided:

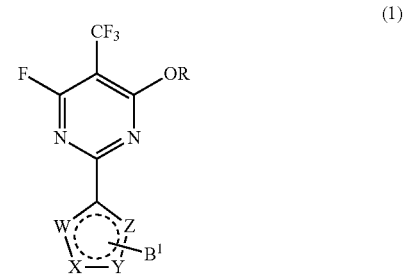

(1)

wherein
R represents a hydrocarbon group having 1 to 12 carbon atoms,
$B^1$ represents a hydrogen atom, a halogen atom, a hydrocarbon group having 1 to 10 carbon atoms, $-C_nF_{2n+1}$, a nitro group, a boronic acid group, $-OA^1$, $-SO_mA^1$, $-NA^1A^2$, $-COOA^1$ or $-CONA^1A^2$,
W, X, Y and Z each independently represent CV or N, provided that at least one of W, X, Y and Z is N,
V represents a hydrogen atom, a halogen atom, a hydrocarbon group having 1 to 10 carbon atoms, $-C_nF_{2n+1}$, a nitro group, a boronic acid group, $-OA^1$, $-SO_mA^1$, $-NA^1A^2$, $-COOA^1$ or $-CONA^1A^2$,
n is an integer of 1 to 10,
m is an integer of 0 to 3, and
$A^1$ and $A^2$ each independently represent a hydrogen atom or a hydrocarbon group having 1 to 10 carbon atoms.

6 Claims, No Drawings

(56) References Cited

FOREIGN PATENT DOCUMENTS

| WO | 2007-075852 | A2 | 7/2007 |
|---|---|---|---|
| WO | 2013-101830 | A1 | 7/2013 |
| WO | 2015-106268 | A1 | 7/2015 |
| WO | 2018-213777 | A1 | 11/2018 |
| WO | 2020-116296 | A1 | 6/2020 |

OTHER PUBLICATIONS

Office Action issued in corresponding Indian Application No. 202237052520 dated Apr. 24, 2023, with English translation (5 Pages).

First Chinese Office Action for corresponding Application No. 202180019719.8 dated Jan. 4, 2023, with English translation (17 Pages).

Yoshio Inoue et al., "A Facile One-Pot Preparation of 2-Methyl-and 2-Phenyl-4-fluoro-5-trifluoromethyl-6-methoxypyrimidine from Methyl 2-hydryl-2-(F-methyl)-F-propyl Ether", Journal of Fluorine Chemistry, vol. 27, Issue 2, p. 231-236, 1985.

Second Office Action issued in corresponding Chinese Patent Application No. 202180019719.8 dated Jul. 8, 2023, with English translation (13 Pages).

Notice of Reasons for Refusal for corresponding Japanese Patent Application No. 2022-510582 dated Oct. 26, 2022, with English translation (5 Pages).

Decision of Refusal for corresponding Chinese Patent Application No. 202180019719.8 dated Jan. 2, 2024, with English translation (11 Pages).

Office Action issued in corresponding European Patent Application No. 21774742.7 dated Jan. 3, 2025 (4 Pages).

Extended European Search Report issued in corresponding Application No. 21774742.7 dated Mar. 15, 2024 (5 Pages).

N. Zhang et al., "Synthesis and SAR of 6-Chloro-4-Fluoroalkylamino-2-Heteroaryl-5-(Substituted)Phenylpyrimidines as Anti-Cancer Agents", Bioorganic & Medicinal Chemistry, Jan. 1, 2009, vol. 17, No. 1, pp. 111-118 (8 Pages).

FLUORINE-CONTAINING PYRIMIDINE COMPOUND, AND METHOD FOR PRODUCING SAME

CROSS REFERENCE TO RELATED APPLICATIONS

This is the National Stage of International Application No. PCT/JP2021/012124, filed Mar. 24, 2021, which claims the benefit of Japanese Patent Application No. 2020-055036 filed Mar. 25, 2020. The contents of these applications are incorporated hereby by reference in their entirety.

BACKGROUND

Technical Field

The present disclosure relates to a fluorine-containing pyrimidine compound and a method for producing the same.

Related Art

Conventionally, fluorine-containing pyrimidine compounds have been reported to have various biological activities. Among them, a compound having an imidazole ring or the like as a substituent at the 2-position of the pyrimidine ring is expected to be used in the fields of medicine and agrochemicals.

More specifically, Bioorganic & Medicinal Chemistry, Vol. 17, 2009, pp. 111-118 discloses a compound having an imidazole ring at the 2-position of a pyrimidine ring. Bioorganic & Medicinal Chemistry, Vol. 17, 2009, pp. 111-118 reports that a compound having a 1-methylimidazolyl group at the 2-position of the pyrimidine ring and a 2,4,6-trifluorophenyl group at the 5-position of the pyrimidine ring has a growth inhibitory activity of COLO205 cells.

On the other hand, as a synthetic method of a pyrimidine compound having a trifluoromethyl group at the 5-position of the pyrimidine ring and substituents at the 4- and 6-positions, for example, the methods disclosed in Tetrahedron, Vol. 72, 2016, pp. 3250-3255, ACS Catalysis, Vol. 8, 2018, pp. 2839-2843, and Angewandte Chemie International Edition, Vol. 57, 2018, pp. 6926-6929 have been known. More specifically, Tetrahedron, Vol. 72, 2016, pp. 3250-3255 reports a synthetic method using sodium trifluoromethanesulfinate (Langlois reagent), ACS Catalysis, Vol. 8, 2018, pp. 2839-2843 reports a synthetic method using a trifluoroacetic acid derivative, and Angewandte Chemie International Edition, Vol. 57, 2018, pp. 6926-6929 reports a synthetic method using trifluoromethanesulfonic acid anhydride.

However, from the viewpoint of reactivity and selectivity, conventionally, it has been difficult to produce a fluorine-containing pyrimidine compound having a fluorine-containing substituent at the 5-position of the pyrimidine ring, a heterocyclic ring as a substituent at the 2-position, and substituents at the 4-position and the 6-position, and such a fluorine-containing pyrimidine compound has not been reported. The fluorine-containing pyrimidine compound is expected to have various biological activities, and a novel fluorine-containing pyrimidine compound having substituents at the 4- and 6-positions of a pyrimidine ring and a heterocyclic ring as a substituent at the 2-position, and establishment of a production method therefor, have been desired.

In the production method reported in Tetrahedron, Vol. 72, 2016, pp. 3250-3255, the regioselectivity upon introduction of the trifluoromethyl group is low, which thereby raises a concern of decreasing introduction efficiency of trifluoromethyl group for a substrate having a plurality of heterocyclic rings such as a pyrimidine compound substituted with a heterocyclic ring, or a concern of difficulty in introducing a trifluoromethyl group. Moreover, not only is 3 times an amount of Langlois reagent used as a trifluoromethylating agent with respect to the substrate, but also manganese(III) acetate hydrate that is harmful as an oxidizing agent is separately used in an amount 3 times that of the substrate, necessitating considering the environmental problems as well.

It is considered that by further modification and derivatization of the compound obtained by the production methods reported in ACS Catalysis, Vol. 8, 2018, pp. 2839-2843, and Angewandte Chemie International Edition, Vol. 57, 2018, pp. 6926-6929, it is converted into the fluorine-containing pyrimidine compound. However, there have been cases where complexity and reduction in efficiency due to an increase in the number of steps are unavoidable, or the production of the fluorine-containing pyrimidine compound itself is difficult. Further, it is considered to be unsuitable for practical use because irradiation with light in the presence of a ruthenium complex catalyst is necessary, 2.5 to 3 times an amount of trifluoromethylating agent is required for use with respect to the substrate in ACS Catalysis, Vol. 8, 2018, pp. 2839-2843, and 3 times an amount of trifluoromethylating agent is required for use with respect to the substrate in Angewandte Chemie International Edition, Vol. 57, 2018, pp. 6926-6929.

SUMMARY

Therefore, the present inventors have found that a predetermined azole-based structure can be introduced at the 2-position between the two nitrogen atoms on a pyrimidine ring by reacting specific raw materials, and thus have completed the present disclosure. Namely, the present disclosure provides a novel fluorine-containing pyrimidine compound that has substituents at the 4-position and the 6-position of the pyrimidine ring and the azole-based structure as a substituent at the 2-position, which has not been known conventionally, and a production method capable of easily producing the fluorine-containing pyrimidine compound.

The fluorine-containing pyrimidine compound according to an embodiment of the present disclosure is represented by the following formula (1):

[Formula 1]

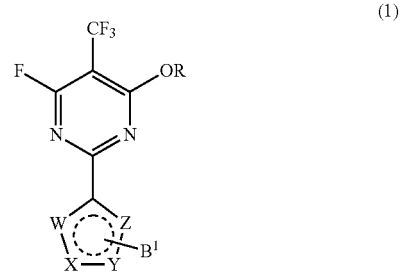

wherein

R represents a hydrocarbon group having 1 to 12 carbon atoms, $B^1$ represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-OOOA^1$ or $-CONA^1A^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and $A^1$ and $A^2$ each independently represent a hydrogen atom or a hydrocarbon group having 1 to 10 carbon atoms.

The method for producing a fluorine-containing pyrimidine compound according to an embodiment of the present disclosure includes a step of reacting a fluoroisobutylene derivative represented by the following formula (2) with a compound represented by the following formula (3) or a salt thereof to obtain a fluorine-containing pyrimidine compound of the following formula (1):

[Formula 2]

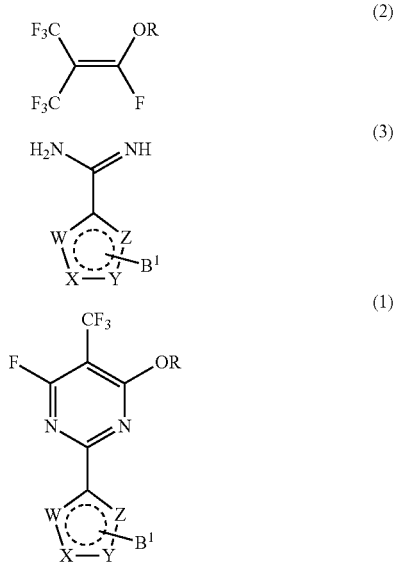

(2)

(3)

(1)

wherein

R represents a hydrocarbon group having 1 to 12 carbon atoms, $B^1$ represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-OOOA^1$ or $-CONA^1A^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and $A^1$ and $A^2$ each independently represent a hydrogen atom or a hydrocarbon group having 1 to 10 carbon atoms.

The method for producing a fluorine-containing pyrimidine compound according to another embodiment of the present disclosure includes a step of reacting a fluoroisobutane derivative represented by the following formula (4) with a compound represented by the following formula (3) or a salt thereof to obtain a fluorine-containing pyrimidine compound of the following formula (1):

[Formula 3]

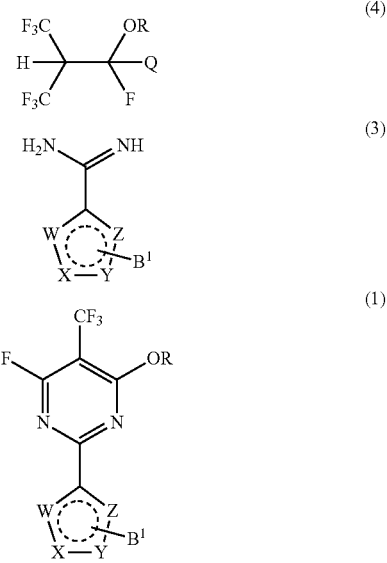

(4)

(3)

(1)

wherein

Q represents a halogen atom, $-OA^1$, $-SO_mA^1$ where m is an integer of 0 to 3, or $-NA^1A^2$, R represents a hydrocarbon group having 1 to 12 carbon atoms, $B^1$ represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-OOOA^1$ or $-CONA^1A^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, $-C_nF_{2n+1}$ where n is an integer of 1 to 10, a nitro group, a boronic acid group, $-OA^1$, $-SO_mA^1$ where m is an integer of 0 to 3, $-NA^1A^2$, $-COOA^1$ or $-CONA^1A^2$, and $A^1$ and $A^2$ each independently represent a hydrogen atom or a hydrocarbon group having 1 to 10 carbon atoms.

In one embodiment of the present disclosure, R is an alkyl group having 1 to 10 carbon atoms.

Effects of Disclosure

According to the present disclosure, a novel fluorine-containing pyrimidine compound having substituents at the 4-position and 6-position of a pyrimidine ring, and an azole-based structure at the 2-position, and a production method capable of easily producing the fluorine-containing pyrimidine compound, can be provided.

DETAILED DESCRIPTION

Hereinafter, embodiments of the present disclosure will be described in detail. However, the scope of the present disclosure is not limited to the specific examples described below.

(Fluorine-Containing Pyrimidine Compound)

The fluorine-containing pyrimidine compound in the present embodiment is represented by the following formula (1), and has specific substituents (—OR, —CF$_3$, —F) on the 4-, 5-, and 6-positions of the pyrimidine ring, respectively, and an azole-based structure at the 2-position. The pyrimidine ring is bonded to a substituent having the predetermined azole-based structure, and specifically, the carbon atom present between the two nitrogen atoms on the pyrimidine ring is bonded to the carbon atom present in the azole-based structure. Namely, the nitrogen atom present in the azole-based structure is not directly bonded to the carbon atom present between the two nitrogen atoms on the pyrimidine ring.

[Formula 4]

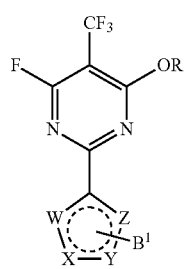

(1)

R is not particularly limited as long as it is a hydrocarbon group having 1 to 12 carbon atoms and is composed of a carbon atom and a hydrogen atom, and includes a chain hydrocarbon group, an aromatic hydrocarbon group, an alicyclic hydrocarbon group and the like. The chain hydrocarbon group is not particularly limited as long as the total number of carbon atoms is 1 to 12, and may be a linear hydrocarbon group or a branched chain hydrocarbon group. When R is an aromatic hydrocarbon group, the aromatic hydrocarbon group is not particularly limited as long as the total number of carbon atoms is 6 to 12, and may be an aromatic hydrocarbon group having a substituent or an aromatic hydrocarbon group having no substituent. Moreover, the aromatic hydrocarbon group may have a condensed polycyclic structure. When R is an alicyclic hydrocarbon group, the alicyclic hydrocarbon group is not particularly limited as long as the total number of carbon atoms is 3 to 12, and may be an alicyclic hydrocarbon group having a substituent or an alicyclic hydrocarbon group having no substituent. Further, the alicyclic hydrocarbon group may have a bridged ring structure.

Examples of the chain hydrocarbon group include alkyl groups such as a methyl group, an ethyl group, a n-propyl group, an i-propyl group, a n-butyl group, an i-butyl group, a sec-butyl group, a tert-butyl group, a pentyl group, a hexyl group, a heptyl group, an octyl group, a nonyl group, a decyl group, an undecyl group and a dodecyl group;

alkenyl groups such as an ethenyl group, a propenyl group, a butenyl group, a pentenyl group, a hexenyl group, a heptenyl group, an octenyl group, a nonenyl group, a decenyl group, an undecenyl group and a dodecenyl group; and alkynyl groups such as an ethynyl group, a propynyl group, a butynyl group, a pentynyl group, a hexynyl group, a heptynyl group, an octynyl group, a nonynyl group, a decynyl group, an undecynyl group and a dodecynyl group.

Examples of the aromatic hydrocarbon group include a phenyl group and a naphthyl group.

Examples of the alicyclic hydrocarbon group include a saturated or unsaturated cyclic hydrocarbon group, and examples of the cyclic hydrocarbon group include a cyclopropyl group, a cyclobutyl group, a cyclohexyl group, a cyclopentyl group, an adamantyl group and a norbornyl group.

R is preferably an alkyl group having 1 to 10 carbon atoms. R being an alkyl group having 1 to 10 carbon atoms enables the fluoroisobutylene derivative of formula (2) and the fluoroisobutane derivative of formula (4), which are raw materials of the fluorine-containing pyrimidine compound, to be easily prepared.

$B^1$ represents a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, and preferably represents a hydrogen atom, a halogen atom, a hydrocarbon group having 1 to 10 carbon atoms, —$C_nF_{2n+1}$, a nitro group, —$OA^1$, —$SO_mA^1$ or —$COOA^1$.

In $B^1$, the halogen atom is F, Cl, Br or I, and preferably F or Cl.

In $B^1$, the hydrocarbon group having 1 to 10 carbon atoms is not particularly limited as long as it is a hydrocarbon group composed of a carbon atom and a hydrogen atom, and can be, for example, a hydrocarbon group having 1 to 10 carbon atoms in R described above.

In $B^1$, —$C_nF_{2n+1}$ is not particularly limited as long as it is a perfluoroalkyl group composed of a carbon atom and a fluorine atom, and may be linear or branched. In addition, n is an integer of 1 to 10, and preferably an integer of 1 to 3.

In $B^1$, $A^1$ included in —$OA^1$ and —$SO_mA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above. Further, m is an integer of 0 to 3, and preferably an integer of 0 to 2.

In $B^1$, $A^1$ and $A^2$ included in —$NA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

In $B^1$, $A^1$ included in —$COOA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above.

In $B^1$, $A^1$ and $A^2$ included in —$CONA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

W, X, Y and Z each independently represent CV or N, provided that at least one of W, X, Y and Z is N, and N optionally has a substituent. Namely, at least one of W, X, Y and Z is substituted or unsubstituted N. When at least one of W, X, Y and Z is CV, V represents a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, and preferably represents a hydrogen atom, a halogen atom, a hydrocarbon group having 1 to 10 carbon atoms, —$C_nF_{2n+1}$, a nitro group, —$OA^1$, —$SO_mA^1$ or —$COOA^1$. At least two of W, X, Y and Z are each preferably substituted or unsubstituted N. When N has a substituent, the substituent is preferably a hydrocarbon group having 1 to 20 carbon atoms, and examples thereof include a methyl group, an ethyl group, a n-propyl group, an i-propyl group, a n-butyl group, an i-butyl group, a sec-butyl group, a tert-butyl group, a phenyl group, a benzyl group and a triphenylmethyl group. Such a hydrocarbon group is not particularly limited as long as it is a hydrocarbon group composed of a carbon atom and a hydrogen atom, and can be, for example, a hydrocarbon group having 1 to 10 carbon atoms in R described above.

In V, the halogen atom is F, Cl, Br or I, and preferably F or Cl.

In V, the hydrocarbon group having 1 to 10 carbon atoms is not particularly limited as long as it is a hydrocarbon group composed of a carbon atom and a hydrogen atom, and can be, for example, a hydrocarbon group having 1 to 10 carbon atoms in R described above.

In V, —$C_nF_{2n+1}$ is not particularly limited as long as it is a perfluoroalkyl group composed of a carbon atom and a fluorine atom, and may be linear or branched. In addition, n is an integer of 1 to 10, and preferably an integer of 1 to 3.

In V, $A^1$ included in —$OA^1$ and —$SO_mA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above. Further, m is an integer of 0 to 3, and preferably an integer of 0 to 2.

In V, $A^1$ and $A^2$ included in —$NA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

In V, $A^1$ included in —$COOA^1$ represents a hydrogen atom or a hydrocarbon group having 1 to 10 carbon atoms. When $A^1$ represents a hydrocarbon group having 1 to 10 carbon atoms, it can be, for example, a hydrocarbon group having 1 to 10 carbon atoms in R described above.

In V, $A^1$ and $A^2$ included in —$CONA^1A^2$ each independently represent a hydrogen atom or a hydrocarbon group having 1 to 10 carbon atoms. $A^1$ and $A^2$ may be the same or different from each other. When $A^1$ and $A^2$ represent a hydrocarbon group having 1 to 10 carbon atoms, they can be, for example, hydrocarbon groups having 1 to 10 carbon atoms in R described above.

The fluorine-containing pyrimidine compound in the present embodiment has a specific substituent (azole-based structure such as an imidazolyl group) at the 2-position of the pyrimidine ring, and specific substituents (—OR, —$CF_3$, —F) on the 4-position, 5-position and 6-position of the pyrimidine ring, and thereby it can have an excellent effect from the viewpoint of structural expandability, and in particular, desired biological activity (for example, growth inhibitory activity of various types of cells) can be expected. Moreover, when the azole-based structure has a substituent, further properties can be imparted to the fluorine-containing pyrimidine compound in the present embodiment. Moreover, the substituents on the 4- and 6-positions of the pyrimidine ring being different groups (—OR and —F) can facilitate derivatization into an asymmetric structure, which can also be expected to be used as an intermediate. More specifically, reacting the fluorine-containing pyrimidine compound under acidic conditions to modify —OR can provide a derivative. Moreover, reacting the fluorine-containing pyrimidine compound under basic conditions to modify —F can provide a derivative. The fluorine-containing pyrimidine compound in the present embodiment is useful in the field of, for example, electronic materials such as organic semiconductors and liquid crystals.

(Method for Producing Fluorine-Containing Pyrimidine Compound)

The method for producing a fluorine-containing pyrimidine compound in the present embodiment includes (a) a step of reacting a fluoroisobutylene derivative represented by the following formula (2) with a compound represented by the following formula (3) or a salt thereof to obtain a fluorine-containing pyrimidine compound of the following formula (1):

[Formula 5]

(2)

(3)

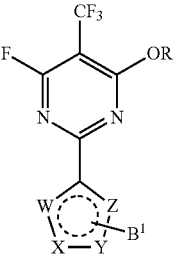

(1)

wherein

R represents a hydrocarbon group having 1 to 12 carbon atoms, $B^1$ represents a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, —$C_nF_{2n+1}$ (n is an integer of 1 to 10), a nitro group, a boronic acid group, —$OA^1$, —$SO_mA^1$ (m is an integer of 0 to 3), —$NA^1A^2$, —$COOA^1$ or —$CONA^1A^2$, and $A^1$ and $A^2$ each independently represent a hydrogen atom or a hydrocarbon group having 1 to 10 carbon atoms.

In formula (2), R is the same as that defined in the compound of formula (1) described above, and in formula (3), each of $B^1$, W, X, Y and Z is the same as that defined in the compound of formula (1) described above.

R in the above formula (2) preferably represents an alkyl group having 1 to 10 carbon atoms. R in formula (2) can be, for example, an alkyl group having 1 to 10 carbon atoms in R in formula (1) described above.

A reaction of (a) above between the fluoroisobutylene derivative represented by formula (2) and the compound represented by formula (3) is represented by the following reaction formula (A).

[Formula 6]

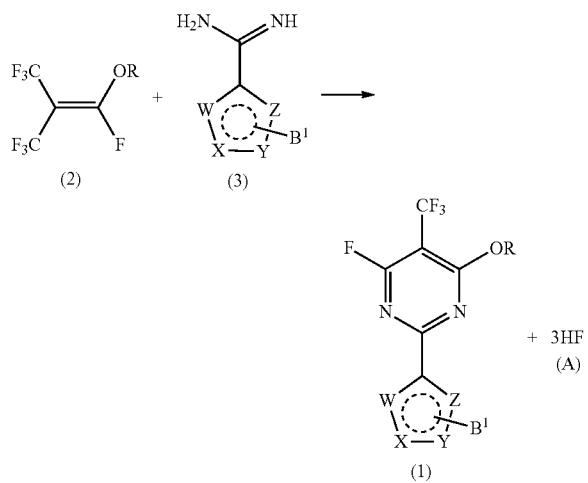

In the above reaction formula (A), the compounds of the above formula (3) each may be in the form of salt. Examples of the compounds of formula (3) in the form of salts include a compound in a form of at least one of the amino moiety (—$NH_2$) and the imino moiety (=NH) constituting the amidino group of the compounds of formula (3), being cationized to (—$NH_3^+$) and (=$NH_2^+$) to form a salt with the counterion. The counterion is not particularly limited as long as it is a monovalent anion, and includes, for example, halide ions such as $F^-$, $Cl^-$, $Br^-$ and $I^-$.

In the method for producing a fluorine-containing pyrimidine compound in the present embodiment, for example, the reaction of (a) above can be carried out in one step in the presence of a hydrogen halide scavenger. Therefore, the fluorine-containing pyrimidine compound of the above formula (1) can be easily obtained. In the reaction of (a) above, a cyclic pyrimidine structure is formed between the fluoroisobutylene derivative represented by formula (2) and the amidino group of the compound of formula (3). At the 2-position of the pyrimidine structure, a group derived from the azole-based structure in the compound of formula (3) is located. Further, —OR, $CF_3$ and F derived from the fluoroisobutylene derivative are located at the 4-position, 5-position and 6-position of the pyrimidine structure, respectively.

The hydrogen halide scavenger is a substance having a function of capturing hydrogen fluoride (HF) formed from a hydrogen atom derived from the amidino group in the compounds of formula (3) and a fluorine atom derived from the fluoroisobutylene derivative of formula (2), in the reaction formula (A). As the hydrogen halide scavenger, an inorganic compound such as sodium hydroxide, potassium hydroxide, calcium hydroxide, sodium carbonate, potassium carbonate, sodium fluoride and potassium fluoride, and an organic nitrogen derivative such as pyridine, triethylamine, diisopropylethylamine, diazabicyclononene, diazabicycloundecene, methyltriazabicyclodecene and diazabicyclooctane, can be used.

The step of obtaining a fluorine-containing pyrimidine compound of (A) above may be carried out in the presence of a fluoride ion scavenger. The fluoroisobutylene derivative represented by the above formula (2) and the compound represented by the above formula (3) or a salt thereof are preferably reacted in the presence of, as a fluoride ion scavenger, a salt of a lithium, sodium, magnesium, potassium, calcium or tetramethylammonium cation and of a trifluoroacetate, heptafluorobutyrate, methanesulfonate, ethanesulfonate, benzenesulfonate, toluenesulfonate, trifluoromethanesulfonate, nonafluorobutanesulfonate, bis(trifluoromethanesulfonyl)imide, bis(nonafluorobutanesulfonyl)imide, N,N-hexafluoropropane-1,3-disulfonyl imide, tetraphenylborate, tetrakis[3,5-bis(trifluoromethyl)phenyl]borate or tetrakis(pentafluorophenyl)borate anion. Among these, a potassium salt or sodium salt is preferably used, and a sodium salt is more preferably used. It is conjectured that the cation derived from the fluoride ion scavenger captures the fluorine ion released from the fluoroisobutylene derivative represented by formula (2) during the reaction to form a precipitate as a salt with low solubility in organic solvents, thereby promoting the reaction, which results in a high yield of the fluorine-containing pyrimidine compound represented by the above formula (1).

A reaction temperature upon reaction (a) above is preferably 0 to 100° C., more preferably 5 to 50° C., and still more preferably 10 to 20° C. A reaction time upon reaction (a) above is preferably 0.5 to 48 hours, more preferably 1 to 36 hours, and still more preferably 2 to 12 hours.

A solvent used in the reaction of (a) above includes aprotic polar solvents such as tetrahydrofuran, monoglyme, diglyme, triglyme, tetraglyme, acetonitrile, dimethylformamide, dimethylacetamide, methylpyrrolidone, dimethylethyleneurea, tetramethylurea, dimethylsulfoxide and sulfolane, or two-phase solvents of a protonic polar solvent such as water and a water-insoluble solvent such as dichloromethane, toluene and diethyl ether. Moreover, as the catalyst for the reaction in (a) above, a quaternary ammonium halide such as benzyltriethylammonium chloride, a quaternary phosphonium halide, a crown ether or the like can optionally be used.

The method for producing a fluorine-containing pyrimidine compound in another embodiment includes (b) a step of reacting a fluoroisobutane derivative represented by the following formula (4) with a compound represented by the following formula (3) or a salt thereof to obtain a fluorine-containing pyrimidine compound of the following formula (1):

[Formula 7]

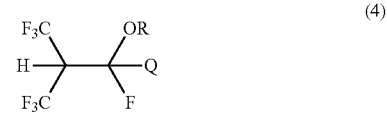

-continued

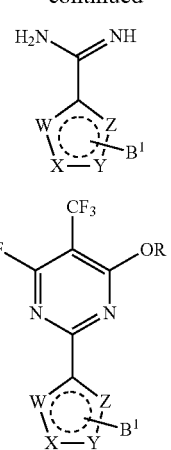

wherein

Q represents a halogen atom, —OA$^1$, —SO$_m$A$^1$ (m is an integer of 0 to 3) or —NA$^1$A$^2$, R represents a hydrocarbon group having 1 to 12 carbon atoms, B$^1$ represents a hydrogen atom, a halogen atom, a hydrocarbon group having 1 to 10 carbon atoms, —C$_n$F$_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, —C$_n$F$_{2n+1}$ (n is an integer of 1 to 10), a nitro group, a boronic acid group, —OA$^1$, —SO$_m$A$^1$ (m is an integer of 0 to 3), —NA$^1$A$^2$, —COOA$^1$ or —CONA$^1$A$^2$, and A$^1$ and A$^2$ each independently represent a hydrogen atom or a hydrocarbon group having 1 to 10 carbon atoms.

In formula (4), R is the same as that defined in the compounds of formula (1) described above, and the halogen atom, —OA$^1$, —SO$_m$A$^1$ (m is an integer of 0 to 3) and —NA$^1$A$^2$ are the same as those defined in the compounds of formula (1) described above.

R in the above formulae (1) and (4) preferably represents an alkyl group having 1 to 10 carbon atoms. R in formula (4) can be, for example, an alkyl group having 1 to 10 carbon atoms in R in formula (1) described above.

A reaction of (b) above between the fluoroisobutane derivative represented by formula (4) and the compound represented by formula (3) is represented by the following reaction formula (B).

[Formula 8]

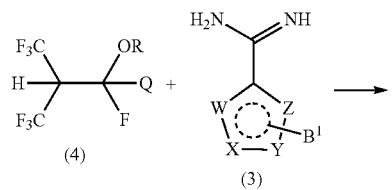

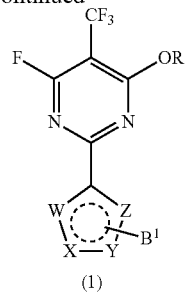

In the reaction formula (B), the compounds of formula (3) each may be in the form of salts. Examples of the compounds of formula (3) in the form of salts include a compound in the form of at least one of the amino moiety (—NH$_2$) and the imino moiety (=NH) constituting the amidino group of the compounds of formula (3), being cationized to (—NH$_3^+$) and (=NH$_2^+$) to form a salt with the counterion. The counterion is not particularly limited as long as it is a monovalent anion, and includes, for example, halide ions such as F$^-$, Cl$^-$, Br$^-$ and I$^-$.

In the method for producing a fluorine-containing pyrimidine compound in the other embodiment, for example, the reaction of (B) above can be carried out in one step. Therefore, the fluorine-containing pyrimidine compounds of the above formula (1) can be easily obtained. In the reaction of (b) above, a cyclic pyrimidine structure is formed between the fluoroisobutane derivative represented by formula (4) and the amidino group of the compounds of formula (3). At the 2-position of the pyrimidine structure, a group derived from the azole-based structure in the compounds of formula (3) is located. Further, —OR, CF$_3$ and F derived from the fluoroisobutane derivative are located at the 4-position, 5-position and 6-position of the pyrimidine structure, respectively.

A reaction temperature upon reaction (b) above is preferably 0 to 100° C., more preferably 5 to 50° C., and still more preferably 10 to 20° C. A reaction time upon reaction (b) above is preferably 0.5 to 48 hours, more preferably 1 to 36 hours, and still more preferably 4 to 24 hours. In the reaction of (b) above, the same hydrogen halide scavengers as that of (a) above may be used.

A solvent used in the reaction of (b) above includes aprotic polar solvents such as tetrahydrofuran, monoglyme, diglyme, triglyme, tetraglyme, acetonitrile, dimethylformamide, dimethylacetamide, methylpyrrolidone, dimethylethyleneurea, tetramethylurea, dimethylsulfoxide and sulfolane, or two-phase solvents of a protonic polar solvent such as water and a water-insoluble solvent such as dichloromethane, toluene and diethyl ether. Moreover, as a catalyst for the reaction of (b) above, optionally, quaternary ammonium halides such as benzyltriethylammonium chloride, a quaternary phosphonium halide and crown ether can be used.

Although the embodiments of the present disclosure have been described above, the present disclosure is not limited to the aforementioned embodiments, and includes all aspects included in the concept and claims of the present disclosure, and can be variously modified within the scope of the present disclosure.

EXAMPLES

Hereinafter, Examples of the present disclosure will be described, but the present disclosure is not limited to these Examples as long as the gist of the present disclosure is not exceeded. Moreover, room temperature denotes a temperature within the range of 20° C.±5° C. unless otherwise specified.

Example 1

Production of 6-Fluoro-4-Methoxy-2-(2-(1-Methylimidazolyl))-5-(Trifluoromethyl)Pyrimidine Under ice-water cooling, to 10 g of acetonitrile were added 2 g (12 mmol) of 1-methyl-2-amidinoimidazole hydrochloride and 3 g (14 mmol) of 1,3,3,3-tetrafluoro-1-methoxy-2-(trifluoromethyl)-1-propene. Subsequently, a mixed solution of 8 g (62 mmol) of diisopropylethylamine and 10 g of acetonitrile was added dropwise such that the internal temperature did not exceed 10° C., and the temperature was raised to room temperature. After about 16 hours, acetonitrile was distilled off under reduced pressure, and thereafter the residue was dissolved in ethyl acetate followed by column purification to obtain 0.7 g of the compound represented by the following formula (5) (chemical formula: $C_{10}H_8F_4N_4O$, molecular weight: 276.19 g/mol). The isolated yield of the obtained compound was 20%.

[Formula 9]

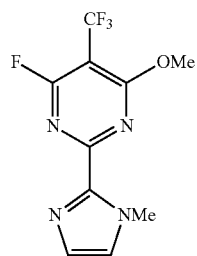

(5)

The analysis results were as follows.
Mass Spectrum (CI, m/z): 276 ([M]$^+$)
$^1$H-NMR (300 MHz, CDCl$_3$) δ ppm: 7.30 (d, 1H), 7.12 (d, 1H), 4.25 (s, 3H), 4.18 (s, 3H)
$^{19}$F-NMR (300 MHz, C$_6$F$_6$) δ ppm: −58.5 (d, 3F), −60.3 (dd, 1F)

Example 2

Production of 6-Fluoro-4-Methoxy-2-(2-(1-Methylimidazolyl))-5-(Trifluoromethyl)Pyrimidine by Using 1,1,1,3,3-Pentafluoro-3-Methoxy-2-(Trifluoromethyl)-Propane Instead of 1,3,3,3-Tetrafluoro-1-Methoxy-2-(Trifluoromethyl)-1-Propene of Example 1

Under ice-water cooling, to 10 g of acetonitrile were added 2 g (12 mmol) of 1-methyl-2-amidinoimidazole hydrochloride and 3 g (14 mmol) of 1,1,1,3,3-pentafluoro-3-methoxy-2-(trifluoromethyl)-1-propane. Subsequently, a mixed solution of 10 g (78 mmol) of diisopropylethylamine and 10 g of acetonitrile was added dropwise such that the internal temperature did not exceed 10° C., and the temperature was raised to room temperature. After about 16 hours, acetonitrile was distilled off under reduced pressure, and thereafter the residue was dissolved in ethyl acetate followed by column purification. The analysis results of the obtained compound were the same as those of the product of Example 1.

In Example 2, the isolated yield of the obtained compound was not calculated, but types and amounts of impurities are expected to be increased due to the by-product that can be generated in the course of producing 1,3,3,3-tetrafluoro-1-methoxy-2-(trifluoromethyl)-1-propene form 1,1,1,3,3-pentafluoro-3-methoxy-2-(trifluoromethyl)-propane in the reaction system. Therefore, the production method of Example 1 is conjectured to give a high isolated yield of the obtained product as compared with the corresponding production method of Example 2.

Example 3

Production of 6-Fluoro-4-Methoxy-2-[3-(1-Methyl-1H-Pyrazolyl)]-5-(Trifluoromethyl)Pyrimidine 0.5 g (2.9 mmol) of 1-methyl-1H-pyrazole-3-carboxyimideamide hydrochloride was dissolved in 29 ml of acetonitrile, 0.7 g (3.3 mmol) of 1,3,3,3-tetrafluoro-1-methoxy-2-(trifluoromethyl)-1-propene and 1.9 g (14.7 mmol) of diisopropylethylamine were added, and the mixture was stirred at room temperature for 23.8 hours. After stirring, the reaction solution was purified by a column to obtain 0.2 g (0.6 mmol) of the compound represented by the following formula (6) (chemical formula: $C_{10}H_8F_4N_4O$, molecular weight: 276.19 g/mol). The isolated yield of the obtained compound was 21.8%.

[Formula 10]

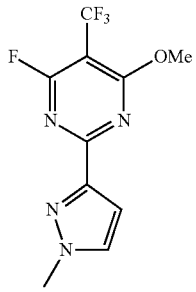

(6)

The analysis results were as follows.
Mass Spectrum (APCI, m/z): 277.1 ([M+H]$^+$)
$^1$H-NMR (400 MHz, CDCl$_3$) δ ppm: 7.46 (d, J=2.5 Hz, 1H), 7.06 (d, J=2.1 Hz, 1H), 4.22 (s, 3H), 2.05 (s, 3H)

Example 4

Production of 6-Fluoro-4-Methoxy-2-[4-(1-Methyl-1H-Pyrazolyl)]-5-(Trifluoromethyl)Pyrimidine 0.4 g (2.3 mmol) of a crude purified product of 1-methyl-1H-pyrazole-4-carboxyimideamide hydrochloride was dissolved in 23 ml of acetonitrile, 0.6 g (2.8 mmol) of 1,3,3,3-tetrafluoro-1-methoxy-2-(trifluoromethyl)-1-propene and 1.6 g (12.4 mmol) of diisopropylethylamine were added, and the mixture was stirred at room temperature for 23 hours. After stirring, the reaction solution was purified by a column to obtain 0.05 g (0.2 mmol) of the compound represented by the following formula (7) (chemical formula: $C_{10}H_8F_4N_4O$, molecular weight: 276.19 g/mol). The 2-step yield of the obtained compound was 4.0%.

[Formula 11]

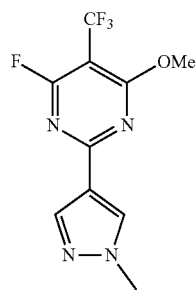

(7)

The analysis results were as follows.
Mass Spectrum (APCI, m/z): 277.1 ([M+H]$^{1+}$)
$^1$H-NMR (400 MHz, CDCl$_3$) δ ppm: 8.15 (s, 1H), 8.11 (s, 1H), 4.16 (s, 3H), 3.98 (s, 3H)

Example 5

Production of 6-Fluoro-4-Methoxy-2-[5-(1-Methyl-1H-Pyrazolyl)]-5-(Trifluoromethyl)Pyrimidine 0.4 g (2.2 mmol) of 1-methyl-1H-pyrazole-5-carboxyimideamide hydrochloride was dissolved in 22 ml of acetonitrile, 0.5 g (2.4 mmol) of 1,3,3,3-tetrafluoro-1-methoxy-2-(trifluoromethyl)-1-propene and 1.5 g (12.6 mmol) of diisopropylethylamine were added, and the mixture was stirred at room temperature for 22.5 hours. After stirring, the reaction solution was purified by a column to obtain 0.2 g (0.8 mmol) of the compound represented by the following formula (8) (chemical formula: C$_{10}$H$_8$F$_4$N$_4$O, molecular weight: 276.19 g/mol). The isolated yield of the obtained compound was 34.7%.

[Formula 12]

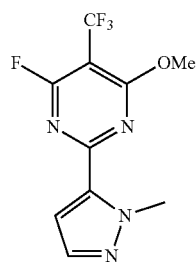

(8)

The analysis results were as follows.
Mass Spectrum (APCI, m/z): 277.5 ([M+H]+)
$^1$H-NMR (400 MHz, CDCl$_3$) δ ppm: 7.54 (d, J=2.1 Hz, 1H), 7.18 (d, J=2.1 Hz, 1H), 4.36 (s, 3H), 4.19 (s, 3H)

Example 6

Production of 6-Fluoro-4-Methoxy-2-[2-(1-Methyl-1H-Pyrrolyl)]-5-(Trifluoromethyl)Pyrimidine 0.3 g of a crude purified product of 1-methyl-1H-pyrrole-2-carboxyimideamide hydrochloride was dissolved in 10 ml of acetonitrile, 0.2 g of 1,3,3,3-tetrafluoro-1-methoxy-2-(trifluoromethyl)-1-propene and 0.4 g of diisopropylethylamine were added, and the mixture was stirred at room temperature for 23 hours. After stirring, the reaction solution was purified by a column to obtain a crude purified product of the compound represented by the following formula (9) (chemical formula: C$_{11}$H$_9$F$_4$N$_3$O, molecular weight: 275.21 g/mol).

[Formula 13]

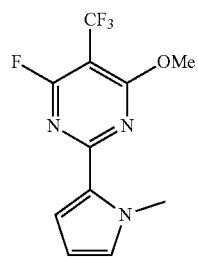

(9)

The analysis results were as follows.
Mass Spectrum (APCI, m/z): 275.8 ([M]$^+$)

Example 7

Production of 6-Fluoro-4-Methoxy-2-(1-Methyl-1H-1,2,3-Triazole-4-Yl)-5-(Trifluoromethyl)Pyrimidine 0.4 g (2.2 mmol) of 1-methyl-1H-1,2,3-triazole-4-carboxyimideamide hydrochloride was dissolved in 22 ml of acetonitrile, 0.6 g (2.8 mmol) of 1,3,3,3-tetrafluoro-1-methoxy-2-(trifluoromethyl)-1-propene and 1.5 g (11.6 mmol) of diisopropylethylamine were added, and the mixture was stirred at room temperature for 21.3 hours. After stirring, the reaction solution was purified by a column to obtain 0.4 g (1.4 mmol) of the compound represented by the following formula (10) (chemical formula: C$_9$H$_7$F$_4$N$_5$O, molecular weight: 277.18 g/mol). The isolated yield of the obtained compound was 69.4%.

[Formula 14]

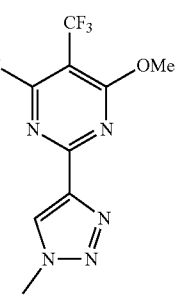

(10)

The analysis results were as follows.
Mass Spectrum (APCI, m/z): 277.7 ([M]+)
$^1$H-NMR (400 MHz, CDCl$_3$) δ ppm: 8.29 (s, 1H), 4.25 (s, 1H), 4.21 (s, 3H)

Example 8

Production of 6-Fluoro-4-Methoxy-2-(1-Methyl-1H-1,2,3-Triazole-5-Yl)-5-(Trifluoromethyl)Pyrimidine 0.3 g (1.9 mmol) of 1-methyl-1H-1,2,3-triazole-5-carboxyimideamide hydrochloride was dissolved in 18 ml of acetonitrile, 0.5 g (2.4 mmol) of 1,3,3,3-tetrafluoro-1-methoxy-2-(trifluoromethyl)-1-propene and 1.2 g (9.3 mmol) of diisopropylethylamine were added, and the mixture was stirred at room temperature for 23 hours. After stirring, the reaction solution was purified by a column to obtain 0.3 g (1.0 mmol) of the compound represented by the following formula (11) (chemical formula: $C_9H_7F_4N_5O$, molecular weight: 277.18 g/mol). The isolated yield of the obtained compound was 52.3%.

[Formula 15]

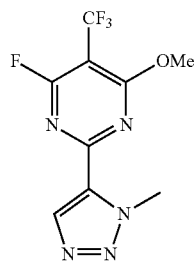
(11)

The analysis results were as follows.
Mass Spectrum (APCI, m/z): 277.7 ([M]+)
$^1$H-NMR (400 MHz, CDCl$_3$) δ ppm: 8.43 (s, 1H), 4.50 (s, 3H), 4.22 (s, 3H)

Example 9

Production of 6-Fluoro-4-Methoxy-2-(1-Methyl-1H-1,2,4-Triazole-5-Yl)-5-(Trifluoromethyl)Pyrimidine 0.3 g (1.8 mmol) of 1-methyl-1H-1,2,4-imidazole-5-carboxyimideamide hydrochloride was dissolved in 18 ml of acetonitrile, 0.4 g (1.9 mmol) of 1,3,3,3-tetrafluoro-1-methoxy-2-(trifluoromethyl)-1-propene and 1.2 g (9.3 mmol) of diisopropylethylamine were added, and the mixture was stirred at room temperature for 19.3 hours. After stirring, the reaction solution was purified by a column to obtain 0.07 g (0.3 mmol) of the compound represented by the following formula (12) (chemical formula: $C_9H_7F_4N_5O$, molecular weight: 277.18 g/mol). The isolated yield of the obtained compound was 14.3%.

[Formula 16]

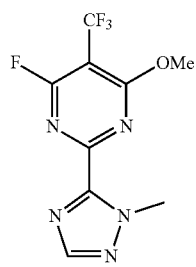
(12)

The analysis results were as follows.
Mass Spectrum (APCI, m/z): 277.7 ([M]+)
$^1$H-NMR (400 MHz, CDCl$_3$) δ ppm: 8.06 (s, 1H), 4.40 (s, 3H), 4.28 (s, 3H)

Example 10

Production of 2-(5-Chloro-1-Methyl-1H-Imidazole-2-Yl)-6-Fluoro-4-Methoxy-5-(Trifluoromethyl)Pyrimidine 0.3 g (1.3 mmol) of 5-chloro-1-methyl-1H-imidazole-2-carboxyimideamide hydrochloride was dissolved in 13 ml of acetonitrile, 0.3 g (1.4 mmol) of 1,3,3,3-tetrafluoro-1-methoxy-2-(trifluoromethyl)-1-propene and 0.9 g (7.0 mmol) of diisopropylethylamine were added, and the mixture was stirred at room temperature for 23 hours. After stirring, the reaction solution was purified by a column to obtain the compound represented by the following formula (13) (chemical formula: $C_{10}H_7ClF_4N_4O$, molecular weight: 310.64 g/mol).

[Formula 17]

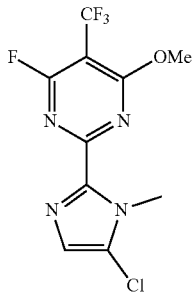
(13)

The analysis results were as follows.
Mass Spectrum (APCI, m/z): 310.0 ([M]+)
$^1$H-NMR (400 MHz, CDCl$_3$) δ ppm: 7.27 (s, 1H), 4.24 (s, 3H), 4.13 (s, 3H)

Example 11

Production of 6-Fluoro-4-Methoxy-2-[2-(Methanesulfonyl)-1-Methyl-1H-Imidazole-4-Yl]-5-(Trifluoromethyl)Pyrimidine 0.3 g (1.5 mmol) of 2-(methanesulfonyl)-1-methyl-1H-imidazole-4-carboxyimideamide hydrochloride was dissolved in 19.4 ml of acetonitrile, 0.5 g (2.4 mmol) of 1,3,3,3-tetrafluoro-1-methoxy-2-(trifluoromethyl)-1-propene and 1.3 g (10.1 mmol) of diisopropylethylamine were added, and the mixture was stirred at room temperature for 17 hours. After stirring, the reaction solution was purified by a column to obtain 0.3 g (0.9 mmol) of the compound represented by the following formula (14) (chemical formula: $C_{11}H_{10}F_4N_4O_3S$, molecular weight: 354.28 g/mol). The isolated yield of the obtained compound was 66.3%.

[Formula 18]

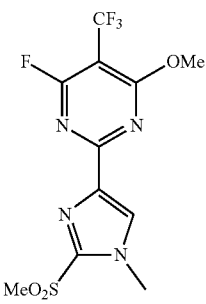
(14)

The analysis results were as follows.

Mass Spectrum (APCI, m/z): 354.0 ([M]+)

$^1$H-NMR (400 MHz, CDCl$_3$) δ ppm: 7.89 (s, 1H), 4.21 (s, 3H), 4.09 (s, 3H), 3.53 (s, 3H)

Example 12

Production of 6-Fluoro-4-Methoxy-2-(1-Phenyl-1H-Imidazole-4-Yl)-5-(Trifluoromethyl)Pyrimidine 0.3 g of a crude purified product of 1-phenyl-1H-imidazole-4-carboxyimideamide hydrochloride was dissolved in 12.4 ml of acetonitrile, 0.3 g (1.4 mmol) of 1,3,3,3-tetrafluoro-1-methoxy-2-(trifluoromethyl)-1-propene and 0.8 g (6.2 mmol) of diisopropylethylamine were added, and the mixture was stirred at room temperature for 14 hours. After stirring, the reaction solution was purified by a column to obtain 0.03 g (0.07 mmol) of the compound represented by the following formula (15) (chemical formula: C$_{15}$H$_{10}$F$_4$N$_4$O, molecular weight: 338.27 g/mol).

[Formula 19]

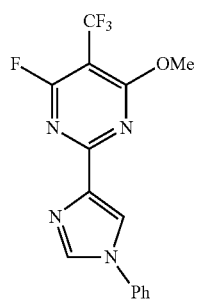

(15)

The analysis results were as follows.

Mass Spectrum (APCI, m/z): 339.1 ([M+H]+)

$^1$H-NMR (400 MHz, CDCl$_3$) δ ppm: 8.21 (d, J=1.2 Hz, 1H), 7.98 (d, J=1.2 Hz, 1H), 7.44-7.57 (m, 5H), 4.25 (s, 3H)

Example 13

Production of 6-Fluoro-4-Methoxy-5-(Trifluoromethyl)-2-(1-Triphenylmethyl-1H-Imidazole-4-Yl)Pyrimidine 0.3 g (0.7 mmol) of a crude purified product of 1-(triphenylmethyl)imidazole-4-carboxyimideamide hydrochloride was dissolved in 7.3 ml of acetonitrile, 0.2 g (0.9 mmol) of 1,3,3,3-tetrafluoro-1-methoxy-2-(trifluoromethyl)-1-propene and 0.5 g (3.9 mmol) of diisopropylethylamine were added, and the mixture was stirred at room temperature for 15.8 hours. After stirring, the reaction solution was purified by a column to obtain 0.02 g (0.04 mmol) of the compound represented by the following formula (16) (chemical formula: C$_{28}$H$_{20}$F$_4$N$_4$O, molecular weight: 504.49 g/mol).

[Formula 20]

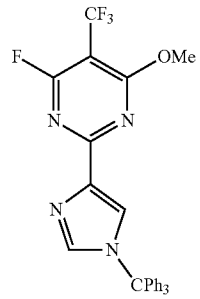

(16)

The analysis results were as follows.

Mass Spectrum (APCI, m/z): 504.2 ([M]$^+$)

$^1$H-NMR (400 MHz, CDCl$_3$) δ ppm: 7.83 (s, 1H), 7.57 (s, 1H), 7.36-7.38 (m, 9H), 7.15-7.18 (m, 6H), 4.18 (s, 3H)

Example 14

Production of 6-Fluoro-2-(1-Methyl-3-Nitro-1H-Pyrazole-5-Yl)-4-Methoxy-5-(Trifluoromethyl)Pyrimidine 0.3 g of a crude purified product of 1-methyl-3-nitro-1H-pyrazole-5-carboxyimideamide hydrochloride was dissolved in 15 ml of acetonitrile, 0.3 g (1.4 mmol) of 1,3,3,3-tetrafluoro-1-methoxy-2-(trifluoromethyl)-1-propene and 1.0 g (7.7 mmol) of diisopropylethylamine were added, and the mixture was stirred at room temperature for 13.4 hours. After stirring, the reaction solution was purified by a column to obtain 0.1 g (0.3 mmol) of the compound represented by the following formula (17) (chemical formula: C$_{10}$H$_7$F$_4$N$_5$O$_3$, molecular weight: 321.19 g/mol).

[Formula 21]

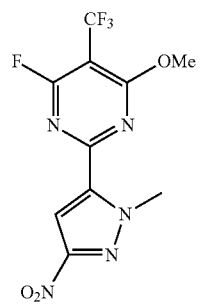

(17)

The analysis results were as follows.

Mass Spectrum (APCI, m/z): 321.3 ([M]$^-$)

$^1$H-NMR (400 MHz, CDCl$_3$) δ ppm: 7.73 (s, 1H), 4.46 (s, 1H), 4.22 (s, 3H)

Example 15

Production of 6-Fluoro-2-[1-Methyl-5-(Methylthio)-1H-Pyrazole-3-Yl]-4-Methoxy-5-(Trifluoromethyl)Pyrimidine 0.5 g (2.0 mmol) of 1-methyl-5-(methylthio)-1H-pyrazole-3-carboxyimideamide hydrochloride was dissolved in 10 ml of acetonitrile, 0.5 g (2.4 mmol) of 1,3,3,3-tetrafluoro-1-methoxy-2-(trifluoromethyl)-1-propene and 1.3 g (10.1 mmol) of diisopropylethylamine were added, and the mixture was stirred at room temperature for 24.4 hours. After stirring, the reaction solution was purified by a column to obtain 0.3 g (0.9 mmol) of the compound represented by the following formula (18) (chemical formula: $C_{11}H_{10}F_4N_4OS$, molecular weight: 322.28 g/mol). The isolated yield of the obtained compound was 47.3%.

[Formula 22]

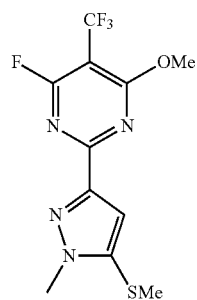

(18)

The analysis results were as follows.

Mass Spectrum (APCI, m/z): 354.0 ([M+MeOH]$^-$)

$^1$H-NMR (400 MHz, CDCl$_3$) δ ppm: 7.04 (s, 1H), 4.22 (s, 3H), 4.01 (s, 3H), 2.49 (s, 3H)

Example 16

Production of 6-Fluoro-4-Methoxy-2-[3-Methoxy-1-Methyl-1H-Pyrazole-4-Yl]-5-(Trifluoromethyl)Pyrimidine 0.2 g of a crude product of 3-methoxy-1-methyl-1H-pyrazole-4-carboxyimideamide hydrochloride was dissolved in 12 ml of acetonitrile, 0.3 g (1.4 mmol) of 1,3,3,3-tetrafluoro-1-methoxy-2-(trifluoromethyl)-1-propene and 0.3 g (6.2 mmol) of diisopropylethylamine were added, and the mixture was stirred at room temperature for 14.7 hours. After stirring, the reaction solution was purified by a column to obtain a crude purified product of the compound represented by the following formula (19) (chemical formula: $C_{11}H_{10}F_4N_4O_2$, molecular weight: 306.22 g/mol).

[Formula 23]

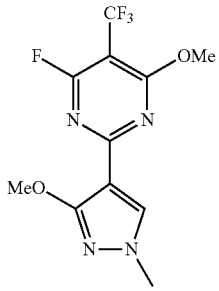

(19)

The analysis results were as follows.

Mass Spectrum (APCI, m/z): 306.7 ([M]$^+$) $^1$H-NMR (400 MHz, CDCl$_3$) δ ppm: 7.96 (s, 1H), 4.14 (s, 3H), 4.02 (s, 3H), 3.81 (s, 3H)

Example 17

Production of 6-Fluoro-4-Methoxy-2-(4-Iodo-1-Methyl-1H-Pyrrolyl-2-Yl)-5-(Trifluoromethyl)Pyrimidine 0.1 g of a crude purified product of 4-iodo-1-methyl-1H-pyrrole-2-carboxyimideamide hydrochloride was dissolved in 6 ml of acetonitrile, 0.2 g of 1,3,3,3-tetrafluoro-1-methoxy-2-(trifluoromethyl)-1-propene and 0.4 g of diisopropylethylamine were added, and the mixture was stirred at room temperature for 15.8 hours. After stirring, the reaction solution was purified by a column to obtain a crude purified product of the compound represented by the following formula (20) (chemical formula: $C_{11}H_8F_4IN_3O$, molecular weight: 401.10 g/mol).

[Formula 24]

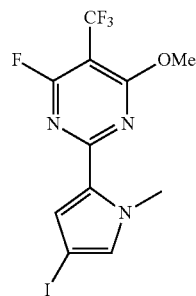

(20)

The analysis results were as follows.
Mass Spectrum (APCI, m/z): 403.5 ([M]$^-$)

Example 18

Production of Methyl 4-[6-Fluoro-4-Methoxy-5-(Trifluoromethyl)Pyrimidin-2-Yl]-1-Methyl-1H-Pyrrole-2-Carboxylate 0.2 g (0.9 mmol) of methyl 4-carbamimidoyl-1-methyl-1H-pyrrole-2-carboxylate hydrochloride was dissolved in 9.2 ml of acetonitrile, 0.2 g (0.9 mmol) of 1,3,3,3-tetrafluoro-1-methoxy-2-(trifluoromethyl)-1-propene and 0.6 g (4.6 mmol) of diisopropylethylamine were added, and the mixture was stirred at room temperature for 14.8 hours. After stirring, the reaction solution was purified by a column to obtain a crude purified product of the compound represented by the following formula (21) (chemical formula: $C_{13}H_{11}F_4N_3O_3$, molecular weight: 333.24 g/mol).

[Formula 25]

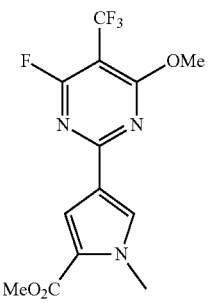

(21)

The analysis results were as follows.

Mass Spectrum (APCI, m/z): 333.6 ([M]$^+$)

$^1$H-NMR (400 MHz, CDCl$_3$) δ ppm: 7.66 (d, J=1.5 Hz, 1H), 7.60 (d, J=1.8 Hz, 1H), 4.16 (s, 3H), 4.00 (s, 3H), 3.86 (s, 3H)

Example 19

Production of 6-Fluoro-4-Methoxy-2-[1-Methyl-5-(Trifluoromethyl)-1H-1,2,3-Triazole-4-Yl]-5-(Trifluoromethyl) Pyrimidine 0.2 g (1.1 mmol) of 1-methyl-5-(trifluoromethyl)-1H-1, 2,3-triazole-4-carboxyimideamide hydrochloride was dissolved in 10 ml of acetonitrile, 0.3 g (1.4 mmol) of 1,3,3, 3-tetrafluoro-1-methoxy-2-(trifluoromethyl)-1-propene and 0.7 g (5.4 mmol) of diisopropylethylamine were added, and the mixture was stirred at room temperature for 15.7 hours. After stirring, the reaction solution was purified by a column to obtain 0.2 g (0.6 mmol) of the compound represented by the following formula (22) (chemical formula: C$_{10}$H$_6$F$_7$N$_5$O, molecular weight: 345.18 g/mol). The isolated yield of the obtained compound was 64.1%.

[Formula 26]

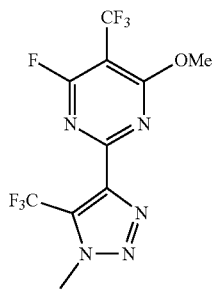

(22)

The analysis results were as follows.

Mass Spectrum (APCI, m/z): 345.8 ([M]$^-$)

$^1$H-NMR (400 MHz, CDCl$_3$) δ ppm: 4.34 (q, J=1.7 Hz, 3H), 4.19 (s, 3H)

Example 20

Production of 6-Fluoro-4-Methoxy-2-(1,5-Dimethyl-1H-1,2,4-Triazole-3-Yl)-5-(Trifluoromethyl)Pyrimidine 0.3 g (1.5 mmol) of 1,5-dimethyl-1H-1,2,4-triazole-3-carboxyimideamide hydrochloride was dissolved in 15 ml of acetonitrile, 0.4 g (1.9 mmol) of 1,3,3,3-tetrafluoro-1-methoxy-2-(trifluoromethyl)-1-propene and 1.0 g (7.7 mmol) of diisopropylethylamine were added, and the mixture was stirred at room temperature for 18.5 hours. After stirring, the reaction solution was purified by a column to obtain a crude purified product of the compound represented by the following formula (23) (chemical formula: C$_{10}$H$_9$F$_4$N$_5$O, molecular weight: 291.21 g/mol).

[Formula 27]

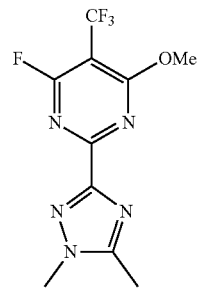

(23)

The analysis results were as follows.

Mass Spectrum (APCI, m/z): 291.7 ([M]$^+$)

The invention claimed is:

1. A fluorine-containing pyrimidine compound represented by the following formula (1):

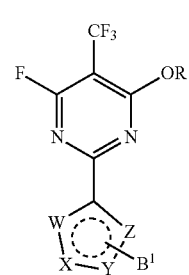

(1)

wherein

R represents a hydrocarbon group having 1 to 12 carbon atoms,

B$^1$ represents a hydrogen atom, a halogen atom, a hydrocarbon group having 1 to 10 carbon atoms, —C$_n$F$_{2n+1}$ where n is an integer of 1 to 10, a nitro group, a boronic acid group, —OA$^1$, —SO$_m$A$^1$ where m is an integer of 0 to 3, —NA$^1$A$^2$, —COOA$^1$ or —CONA$^1$A$^2$, W, X, Y and Z each independently represent CV or N, provided that at least one of W, X, Y and Z is N, and N optionally has a substituent, V represents a hydrogen atom, a halogen atom, a hydrocarbon group having 1 to 10 carbon atoms, —C$_n$F$_{2n+1}$ where n is an integer of 1 to 10, a nitro group, a boronic acid group, —OA$^1$, —SO$_m$A$^1$ where m is an integer of 0 to 3, —NA$^1$A$^2$, —COOA$^1$ or —CONA$^1$A$^2$, and A$^1$ and A$^2$ each independently represent a hydrogen atom or a hydrocarbon group having 1 to 10 carbon atoms.

2. The fluorine-containing pyrimidine compound according to claim 1, wherein R is an alkyl group having 1 to 10 carbon atoms.

3. A method for producing a fluorine-containing pyrimidine compound, comprising:

a step of reacting a fluoroisobutylene derivative represented by the following formula (2) with a compound represented by the following formula (3) or a salt thereof to obtain a fluorine-containing pyrimidine compound of the following formula (1):

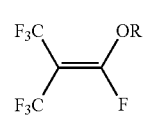

(2)

-continued (3)

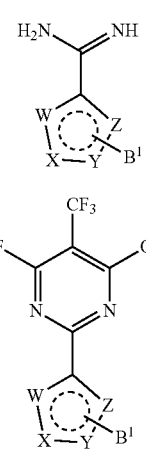

(1)

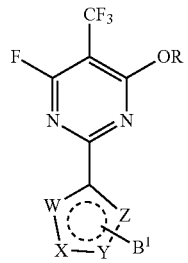

wherein
- R represents a hydrocarbon group having 1 to 12 carbon atoms,
- $B^1$ represents a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, and
- W, X, Y and Z each independently represent CV or N, provided that at least one of W, X, Y and Z is N, and N optionally has a substituent,
- V represents a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, and
- $A^1$ and $A^2$ each independently represent a hydrogen atom or a hydrocarbon group having 1 to 10 carbon atoms.

4. A method for producing a fluorine-containing pyrimidine compound, comprising:
   a step of reacting a fluoroisobutane derivative represented by the following formula (4) with a compound represented by the following formula (3) or a salt thereof to obtain a fluorine-containing pyrimidine compound of the following formula (1):

(4)

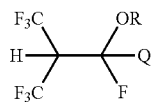

-continued (3)

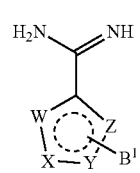

(1)

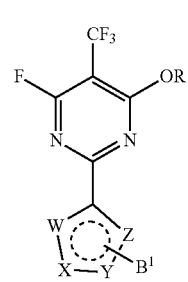

wherein
- Q represents a halogen atom, —$OA^1$, —$SO_mA^1$ where m is an integer of 0 to 3, or —$NA^1A^2$,
- R represents a hydrocarbon group having 1 to 12 carbon atoms,
- $B^1$ represents a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, and
- W, X, Y and Z each independently represent CV or N, provided that at least one of W, X, Y and Z is N, and N optionally has a substituent,
- V represents a hydrogen atom, a halogen atom, a hydrocarbon group having 1 to 10 carbon atoms, —$C_nF_{2n+1}$ where n is an integer of 1 to 10, a nitro group, a boronic acid group, —$OA^1$, —$SO_mA^1$ where m is an integer of 0 to 3, —$NA^1A^2$, —$COOA^1$ or —$CONA^1A^2$, and
- $A^1$ and $A^2$ each independently represent a hydrogen atom or a hydrocarbon group having 1 to 10 carbon atoms.

5. The method for producing a fluorine-containing pyrimidine compound according to claim 3, wherein R is an alkyl group having 1 to 10 carbon atoms.

6. The method for producing a fluorine-containing pyrimidine compound according to claim 4, wherein R is an alkyl group having 1 to 10 carbon atoms.

\* \* \* \* \*